(12) United States Patent
Chen (10) Patent No.: US 10,672,351 B2
(45) Date of Patent: Jun. 2, 2020

(54) PIXEL CIRCUIT

(71) Applicant: E Ink Holdings Inc., Hsinchu (TW)

(72) Inventor: Shyh-Feng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/431,750

(22) Filed: Jun. 5, 2019

(65) Prior Publication Data

US 2019/0385541 A1    Dec. 19, 2019

(30) Foreign Application Priority Data

Jun. 15, 2018    (TW) ................................ 107120621

(51) Int. Cl.
```
G09G 3/34       (2006.01)
G02F 1/167      (2019.01)
G02F 1/1676     (2019.01)
G02F 1/1362     (2006.01)
G02F 1/1685     (2019.01)
G02F 1/1368     (2006.01)
```

(52) U.S. Cl.
CPC ............ *G09G 3/344* (2013.01); *G02F 1/1368* (2013.01); *G02F 1/136286* (2013.01); *G02F 1/167* (2013.01); *G02F 1/1676* (2019.01); *G02F 1/1685* (2019.01); *G09G 2300/0426* (2013.01); *G09G 2300/0439* (2013.01)

(58) Field of Classification Search
CPC .......... G09G 3/344; G09G 2300/0439; G09G 2300/0426; G02F 1/1368; G02F 1/167; G02F 1/1685; G02F 1/136286; G02F 1/1676

See application file for complete search history.

(56) References Cited

U.S. PATENT DOCUMENTS

| | | |
|---|---|---|
| 9,449,994 B2 | 9/2016 | Kwon et al. |
| 9,489,882 B2 | 11/2016 | Kim et al. |
| 9,490,276 B2 | 11/2016 | Kim et al. |
| 9,595,546 B2 | 3/2017 | Kim et al. |
| 9,634,038 B2 | 4/2017 | Kwon et al. |
| 2015/0379923 A1 | 12/2015 | Lee et al. |

FOREIGN PATENT DOCUMENTS

| | | |
|---|---|---|
| CN | 101315757 | 12/2008 |
| TW | 200809718 | 2/2008 |
| TW | I470611 | 1/2015 |
| TW | 201539460 | 10/2015 |

OTHER PUBLICATIONS

"Office Action of Taiwan Counterpart Application," dated Mar. 6, 2019, with English translation thereof, p. 1-p. 8.

*Primary Examiner* — Aneeta Yodichkas
(74) *Attorney, Agent, or Firm* — JCIPRNET (57) ABSTRACT

A pixel circuit arranged in an electrophoretic display is provided. The pixel circuit includes a first transistor, a storage capacitor, and an output stage. A first terminal of the first transistor is coupled to a data line. A control terminal of the first transistor is coupled to a scan line. The storage capacitor is coupled to a second terminal of the first transistor. The output stage is coupled to the second terminal of the first transistor and the storage capacitor. The output stage receives a first voltage and a second voltage. The output stage selectively outputs the first voltage or the second voltage to a pixel electrode of the electrophoretic display according to a data voltage provided by the storage capacitor.

9 Claims, 4 Drawing Sheets

PIXEL CIRCUIT

CROSS-REFERENCE TO RELATED APPLICATION

This application claims the priority benefit of Taiwan application serial no. 107120621, filed on Jun. 15, 2018. The entirety of the above-mentioned patent application is hereby incorporated by reference herein and made a part of this specification.

BACKGROUND OF THE INVENTION

Field of the Invention

The disclosure relates to a circuit, and in particular, to a pixel circuit arranged in an electrophoretic display.

Description of Related Art

In the art of electrophoretic displays (EPD), the amorphous silicon (a-Si) thin-film transistor (TFT) is generally used as the switch element in the driving circuit of pixels and is used to receive scan signals and data signals. The thin-film transistor can control the data voltages provided by data lines to the storage capacitors (Cst) of the pixels according to the scan signals, such that the storage capacitors can provide the stored data voltages to the corresponding electrophoretic cells on the display panel of the electrophoretic display. However, the display panel of the electrophoretic display generally has issues of electrical leakage and capacitance effect. Therefore, after leakage of the power or charge of the storage capacitor, the operating voltage of the electrophoretic cells becomes insufficient, which reduces the display image quality of the electrophoretic display. In view of the above, embodiments of several solutions are provided below.

SUMMARY OF THE INVENTION

The invention provides a pixel circuit that is adapted to be arranged in an electrophoretic display and can steadily and constantly provide voltage to a pixel electrode of the electrophoretic display to enable the electrophoretic display to provide excellent display image quality.

A pixel circuit of the invention is adapted to be arranged in an electrophoretic display. The pixel circuit includes a first transistor, a storage capacitor, and an output stage. A first terminal of the first transistor is coupled to a data line. A control terminal of the first transistor is coupled to a scan line. The storage capacitor is coupled to a second terminal of the first transistor. The output stage is coupled to the second terminal of the first transistor and the storage capacitor. The output stage receives a first voltage and a second voltage. The output stage selectively outputs the first voltage or the second voltage to a pixel electrode of the electrophoretic display according to a data voltage provided by the storage capacitor.

In light of the above, the pixel circuit of the invention can receive the data voltage provided by the storage capacitor through the output stage and output the corresponding positive voltage or negative voltage according to the data voltage. Therefore, the pixel circuit of the invention can steadily and constantly provide voltage to the pixel electrode of the electrophoretic display to enable the electrophoretic display to provide excellent display image quality.

To provide a further understanding of the aforementioned and other features and advantages of the disclosure, exemplary embodiments, together with the reference drawings, are described in detail below.

DESCRIPTION OF THE EMBODIMENTS

To make the content of the invention more comprehensible, embodiments are provided below as examples for realizing the invention accordingly. Moreover, wherever possible, elements/components/steps labeled with the same reference numerals represent the same or similar parts in the drawings and embodiments.

Figure 1:
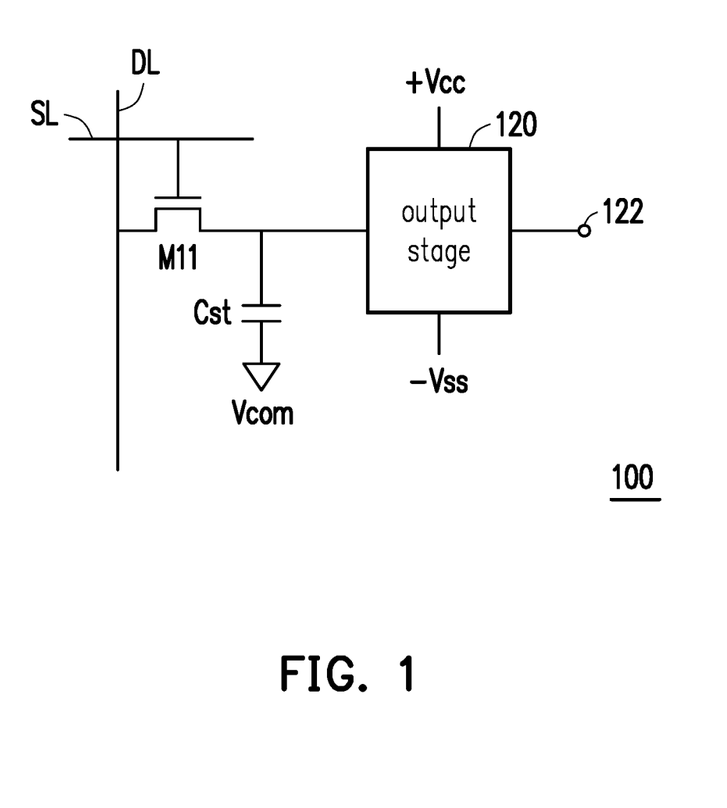
FIG. 1 is a schematic diagram illustrating a pixel circuit according to an embodiment of the invention.

FIG. 1 is a schematic diagram illustrating a pixel circuit according to an embodiment of the invention. Referring to FIG. 1, a pixel circuit 100 includes a transistor M11 (first transistor), a storage capacitor Cst, and an output stage 120. In the present embodiment, a control terminal of the transistor M11 is coupled to a scan line SL, and a first terminal of the transistor M11 is coupled to a data line DL. A first terminal of the storage capacitor Cst is coupled to a second terminal of the transistor M11 and the output stage 120, and a second terminal of the storage capacitor Cst receives a ground voltage Vcom. The storage capacitor Cst is configured to store power provided by the data line DL. In the present embodiment, when the transistor M11 outputs a data signal provided by the data line DL to the storage capacitor Cst according to a scan signal provided by the scan line SL, the storage capacitor Cst stores a data voltage of the data signal. In the present embodiment, the output stage 120 receives a positive voltage +Vcc and a negative voltage −Vss, and the output stage 120 selectively outputs the positive voltage +Vcc or the negative voltage −Vss to an output terminal 122 according to the data voltage provided by the storage capacitor Cst.

In the present embodiment, the output terminal 122 is configured to be coupled to a pixel electrode of one of a plurality of electrophoretic cells arranged in an array in an electrophoretic display. In other words, since an electrical leakage path is not present between the storage capacitor Cst and the output stage 120, the storage capacitor Cst is stably maintained at the data voltage, such that the output stage 120 can correspondingly steadily output the positive voltage +Vcc or the negative voltage −Vss to the pixel electrode. Moreover, it is noted that the transistors described in the embodiments of the invention may be, for example, thin-film transistors (TFT), metal oxide semiconductor field effect transistors (MOSFET), or junction field effect transistors (JFET). In addition, the transistors described in the embodiments of the invention may include N-type transistors and P-type transistors.

Figure 2:
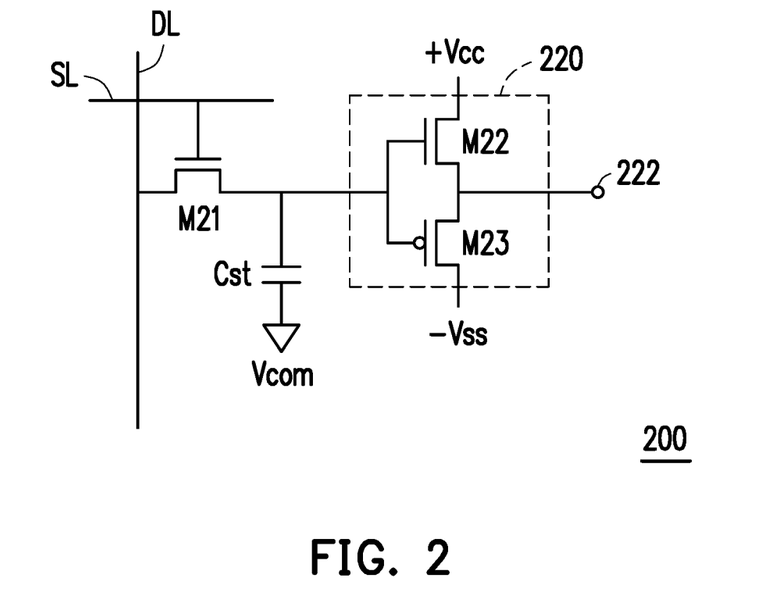
FIG. 2 is a circuit diagram illustrating a pixel circuit according to a first embodiment of the invention.

FIG. 2 is a circuit diagram illustrating a pixel circuit according to a first embodiment of the invention. Referring to FIG. 2, a pixel circuit 200 includes a transistor M21 (first transistor), a storage capacitor Cst, and an output stage 220. In the present embodiment, a control terminal of the transistor M21 is coupled to a scan line SL, and a first terminal of the transistor M21 is coupled to a data line DL. A first terminal of the storage capacitor Cst is coupled to a second terminal of the transistor M21 and the output stage 220, and a second terminal of the storage capacitor Cst receives a ground voltage Vcom. In the present embodiment, when the transistor M21 outputs a data signal provided by the data line DL to the storage capacitor Cst according to a scan signal provided by the scan line SL, the storage capacitor Cst stores a data voltage provided by the data line DL.

In the present embodiment, the output stage 220 includes a transistor M22 (second transistor) and a transistor M23 (third transistor). A first terminal of the transistor M22 receives a positive voltage +Vcc, and a control terminal of the transistor M22 is coupled to the storage capacitor Cst. A first terminal of the transistor M23 is coupled to a second terminal of the transistor M22. A control terminal of the transistor M23 is coupled to the storage capacitor Cst. A second terminal of the transistor M23 receives a negative voltage −Vss. The second terminal of the transistor M22 and the first terminal of the transistor M23 are coupled to an output terminal 222, and the output terminal 222 is coupled to a pixel electrode of an electrophoretic display. In the present embodiment, the transistor M22 is an N-type transistor, and the transistor M23 is a P-type transistor.

In the present embodiment, since an electrical leakage path is not present between the storage capacitor Cst and the output stage 220, the voltage of the storage capacitor Cst changes according to the data signal provided by the data line DL, and electrical leakage does not occur. More specifically, when the data voltage on the storage capacitor Cst is +Vcc+Vth (Vth is a threshold voltage of the transistor), the transistor M22 is on, and the transistor M23 is off. The control terminal of the transistor M22 is maintained at the voltage +Vcc+Vth, such that the second terminal of the transistor M22 constantly outputs the positive voltage +Vcc to the output terminal 222. Conversely, when the data voltage on the storage capacitor Cst is −Vss−Vth, the transistor M22 is off, and the transistor M23 is on. The control terminal of the transistor M23 is maintained at the voltage −Vss−Vth, such that the first terminal of the transistor M23 constantly outputs the negative voltage −Vss to the output terminal 222.

In other words, the pixel circuit 200 of the present embodiment correspondingly outputs the positive voltage +Vcc or the negative voltage −Vss through the output stage 220 according to the data voltage provided by the storage capacitor Cst. Moreover, as the scan signal and the data signal update the voltage of the storage capacitor Cst, the output stage 220 constantly provides voltage to the pixel electrode of the electrophoretic display. Therefore, even if electrical leakage or capacitance effect occurs in the pixel electrode of the electrophoretic display, the output stage 220 of the pixel circuit 200 will constantly supply the positive voltage +Vcc or the negative voltage −Vss to the output terminal 222, such that the voltage provided by the output terminal 222 to the pixel electrode of the electrophoretic display does not experience voltage attenuation.

Moreover, it is noted that the voltage of the data signal provided by the data line DL of the present embodiment is +Vcc+Vth or −Vss−Vth, and the voltage output by the output stage 220 to the pixel electrode of the electrophoretic display is −Vss or +Vcc. In other words, the voltage output by the output stage 220 to the pixel electrode of the electrophoretic display is in phase with the voltage of the data signal, and the voltage level of the data signal provided by the data line DL should be correspondingly adjusted according to the threshold voltage Vth of the transistor M22 and the transistor M23.

Figure 3:
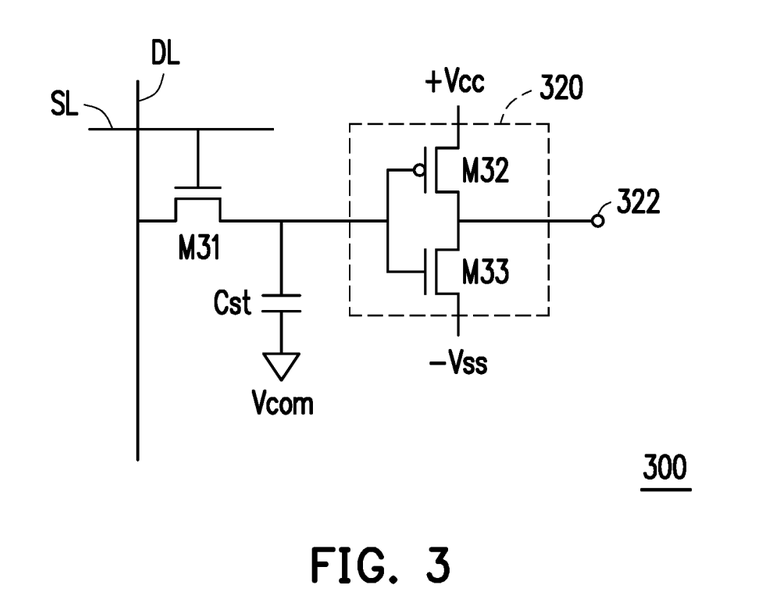
FIG. 3 is a circuit diagram illustrating a pixel circuit according to a second embodiment of the invention.

FIG. 3 is a circuit diagram illustrating a pixel circuit according to a second embodiment of the invention. Referring to FIG. 3, a pixel circuit 300 includes a transistor M31 (first transistor), a storage capacitor Cst, and an output stage 320. In the present embodiment, a control terminal of the transistor M31 is coupled to a scan line SL, and a first terminal of the transistor M31 is coupled to a data line DL. A first terminal of the storage capacitor Cst is coupled to a second terminal of the transistor M31 and the output stage 320, and a second terminal of the storage capacitor Cst receives a ground voltage Vcom. In the present embodiment, when the transistor M31 outputs a data signal provided by the data line DL to the storage capacitor Cst according to a scan signal provided by the scan line SL, the storage capacitor Cst stores a data voltage provided by the data signal.

In the present embodiment, the output stage 320 includes a transistor M32 (second transistor) and a transistor M33 (third transistor). A first terminal of the transistor M32 receives a positive voltage +Vcc, and a control terminal of the transistor M32 is coupled to the storage capacitor Cst. A first terminal of the transistor M33 is coupled to a second terminal of the transistor M32. A control terminal of the transistor M33 is coupled to the storage capacitor Cst. A second terminal of the transistor M33 receives a negative voltage −Vss. The second terminal of the transistor M32 and the first terminal of the transistor M33 are coupled to an output terminal 322, and the output terminal 322 is coupled to a pixel electrode of an electrophoretic display. In the present embodiment, the transistor M32 is a P-type transistor, and the transistor M33 is an N-type transistor.

In the present embodiment, since an electrical leakage path is not present between the storage capacitor Cst and the output stage 320, the voltage of the storage capacitor Cst changes according to the data signal provided by the data line DL, and electrical leakage does not occur. More specifically, when the data voltage on the storage capacitor Cst is −Vss, the transistor M32 is on, and the transistor M33 is off. The control terminal of the transistor M32 is maintained at the voltage −Vss, such that the second terminal of the transistor M32 constantly outputs the positive voltage +Vcc to the output terminal 322. Conversely, when the data voltage on the storage capacitor Cst is +Vcc, the transistor M32 is off, and the transistor M33 is on. The control terminal of the transistor M33 is maintained at the voltage +Vcc, such that the first terminal of the transistor M33 constantly outputs the negative voltage −Vss to the output terminal 322.

In other words, the pixel circuit 300 of the present embodiment correspondingly outputs the positive voltage +Vcc or the negative voltage −Vss through the output stage 320 according to the data voltage provided by the storage capacitor Cst. Moreover, as the scan signal and the data signal update the voltage of the storage capacitor Cst, the output stage 320 constantly provides voltage to the pixel electrode of the electrophoretic display. Therefore, even if electrical leakage or capacitance effect occurs in the pixel electrode of the electrophoretic display, the output stage 320 of the pixel circuit 300 will constantly supply the positive voltage +Vcc or the negative voltage −Vss to the output terminal 322, such that the voltage provided by the output terminal 322 to the pixel electrode of the electrophoretic display does not experience voltage attenuation.

Moreover, it is noted that the voltage of the data signal provided by the data line DL of the present embodiment is +Vcc or −Vss, and the voltage output by the output stage 320 to the pixel electrode of the electrophoretic display is −Vss or +Vcc. In other words, the voltage output by the output stage 320 to the pixel electrode of the electrophoretic display is inverted to the voltage of the data signal provided by the data line DL, and the voltage level output by the output stage 320 to the pixel electrode of the electrophoretic display is identical to the voltage level of the data signal provided by the data line DL.

Figure 4:
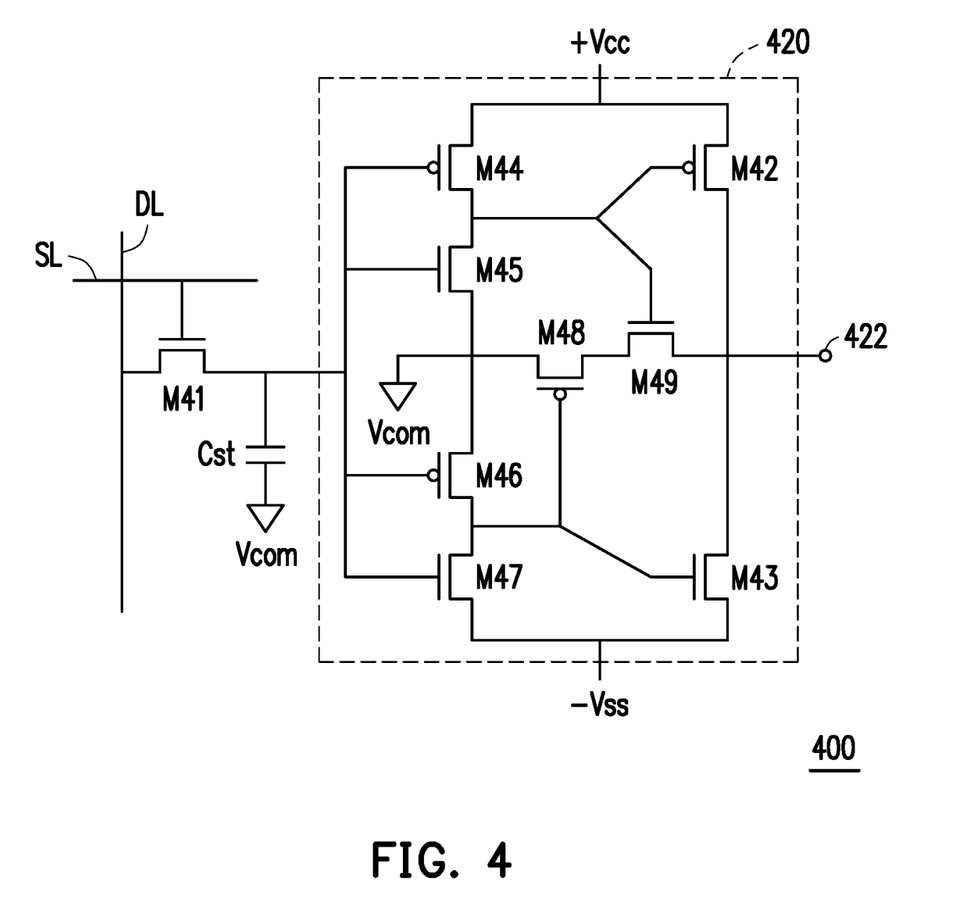
FIG. 4 is a circuit diagram illustrating a pixel circuit according to a third embodiment of the invention.

FIG. 4 is a circuit diagram illustrating a pixel circuit according to a third embodiment of the invention. Referring to FIG. 4, a pixel circuit 400 includes a transistor M41 (first transistor), a storage capacitor Cst, and an output stage 420. In the present embodiment, a control terminal of the transistor M41 is coupled to a scan line SL, and a first terminal of the transistor M41 is coupled to a data line DL. A first terminal of the storage capacitor Cst is coupled to a second terminal of the transistor M41 and the output stage 420, and a second terminal of the storage capacitor Cst receives a ground voltage Vcom. In the present embodiment, when the transistor M41 outputs a data signal provided by the data line DL to the storage capacitor Cst according to a scan signal provided by the scan line SL, the storage capacitor Cst stores a data voltage provided by the data line.

In the present embodiment, the output stage 420 includes a transistor M42 (second transistor) and a transistor M43 (third transistor). A first terminal of the transistor M42 receives a positive voltage +Vcc, and a control terminal of the transistor M42 is coupled to the storage capacitor Cst through a transistor M44 (fourth transistor) and a transistor M45 (fifth transistor). A first terminal of the transistor M43 is coupled to a second terminal of the transistor M42. A control terminal of the transistor M43 is coupled to the storage capacitor Cst through a transistor M46 (sixth transistor) and a transistor M47 (seventh transistor). A second terminal of the transistor M43 receives a negative voltage −Vss. The second terminal of the transistor M42 and the first terminal of the transistor M43 are coupled to an output terminal 422, and the output terminal 422 is coupled to a pixel electrode of an electrophoretic display.

In the present embodiment, a first terminal of the transistor M44 receives the positive voltage +Vcc. A control terminal of the transistor M44 is coupled to the storage capacitor Cst. A second terminal of the transistor M44 is coupled to the control terminal of the transistor M42. A first terminal of the transistor M45 is coupled to the second terminal of the transistor M44 and the control terminal of the transistor M42. A control terminal of the transistor M45 is coupled to the storage capacitor Cst, and a second terminal of the transistor M45 receives a ground voltage Vcom. In the present embodiment, the transistor M44 and the transistor M45 further selectively output the positive voltage +Vcc or the ground voltage Vcom to the control terminal of the transistor M42 according to the data voltage provided by the storage capacitor Cst.

In the present embodiment, a first terminal of the transistor M46 receives the ground voltage Vcom. A control terminal of the transistor M46 is coupled to the storage capacitor Cst. A second terminal of the transistor M46 is coupled to the control terminal of the transistor M43. A first terminal of the transistor M47 is coupled to the second terminal of the transistor M46 and the control terminal of the transistor M43. A control terminal of the transistor M47 is coupled to the storage capacitor Cst. A second terminal of the transistor M47 receives a negative voltage −Vss. In the present embodiment, the transistor M46 and the transistor M47 further selectively output the ground voltage Vcom or the negative voltage −Vss to the control terminal of the transistor M43 according to the data voltage provided by the storage capacitor Cst.

In the present embodiment, a first terminal of a transistor M48 (eighth transistor) is coupled to the second terminal of the transistor M45 and the first terminal of the transistor M46. The first terminal of the transistor M48 receives the ground voltage Vcom. A control terminal of the transistor M48 is coupled to the control terminal of the transistor M43. A first terminal of a transistor M49 (ninth transistor) is coupled to a second terminal of the transistor M48. A control terminal of the transistor M49 is coupled to the control terminal of the transistor M42. A second terminal of the transistor M49 is coupled to the pixel electrode of the electrophoretic display. In the present embodiment, the transistor M48 and the transistor M49 further selectively output the ground voltage Vcom to the pixel electrode of the electrophoretic display according to the data voltage provided by the storage capacitor Cst. In the present embodiment, the transistor M42, the transistor M44, the transistor M46, and the transistor M48 are P-type transistors. The transistor M43, the transistor M45, the transistor M47, and the transistor M49 are N-type transistors.

In the present embodiment, since an electrical leakage path is not present between the storage capacitor Cst and the output stage 420, the voltage of the storage capacitor Cst changes according to the data signal provided by the data line DL, and electrical leakage does not occur. More specifically, when the data voltage on the storage capacitor Cst is +Vcc, the transistor M44 is off, and the transistor M45 is on. At this time, the control terminal of the transistor M42 receives the ground voltage through the transistor M45 to turn on the transistor M42. The transistor M42 outputs the positive voltage +Vcc to the output terminal 422. Moreover, the transistor M46 and the transistor M49 are off, and the transistor M47 is on. At this time, the control terminal of the transistor M43 receives the negative voltage −Vss through the transistor M47 to turn off the transistor M43. Therefore, when the data voltage on the storage capacitor Cst is +Vcc, the output terminal 422 can similarly steadily output the positive voltage +Vcc.

Conversely, when the data voltage on the storage capacitor Cst is −Vss, the transistor M46 is on, and the transistor M47 is off. At this time, the control terminal of the transistor M43 receives the ground voltage through the transistor M46 to turn on the transistor M43. The transistor M43 outputs the negative voltage −Vss to the output terminal 422. Moreover, the transistor M45 and the transistor M48 are off, and the transistor M44 is on. At this time, the control terminal of the transistor M42 receives the positive voltage +Vcc through the transistor M44 to turn off the transistor M42. Therefore, when the data voltage on the storage capacitor Cst is −Vss, the output terminal 422 can similarly steadily output the negative voltage −Vss.

Moreover, when the data voltage on the storage capacitor Cst is 0V or a neutral (such as the ground), the transistor M44 and the transistor M47 are on, and the transistor M45 and the transistor M46 are off. At this time, the transistor M42 and the transistor M43 are off, and the transistor M48 and the transistor M49 are on. Therefore, when the data voltage on the storage capacitor Cst is 0V or a neutral (such as the ground voltage Vcom), the output terminal 422 correspondingly outputs the ground voltage Vcom.

In other words, the pixel circuit 400 of the present embodiment correspondingly outputs the positive voltage +Vcc, the negative voltage −Vss, or the ground voltage Vcom through the output stage 420 according to the data voltage provided by the storage capacitor Cst. Moreover, as the scan signal and the data signal update the voltage of the storage capacitor Cst, even if electrical leakage or capacitance effect occurs in the pixel electrode of the electrophoretic display, the output stage 420 of the pixel circuit 400 will constantly supply the positive voltage +Vcc, the negative voltage −Vss, or the ground voltage Vcom to the output terminal 422, such that the voltage provided by the output terminal 422 to the pixel electrode of the electrophoretic display does not experience voltage attenuation.

Moreover, it is noted that the voltage of the data signal provided by the data line DL of the present embodiment is +Vcc, −Vss, 0V, or a neutral, and the voltage output by the output stage 420 to the pixel electrode of the electrophoretic display may correspondingly be +Vcc, −Vss, or Vcom. In other words, the voltage output by the output stage 420 to the pixel electrode of the electrophoretic display is in phase with the voltage of the data signal provided by the data line DL, and the voltage level output by the output stage 420 to the pixel electrode of the electrophoretic display is identical to the voltage level of the data signal provided by the data line DL.

Figure 5:
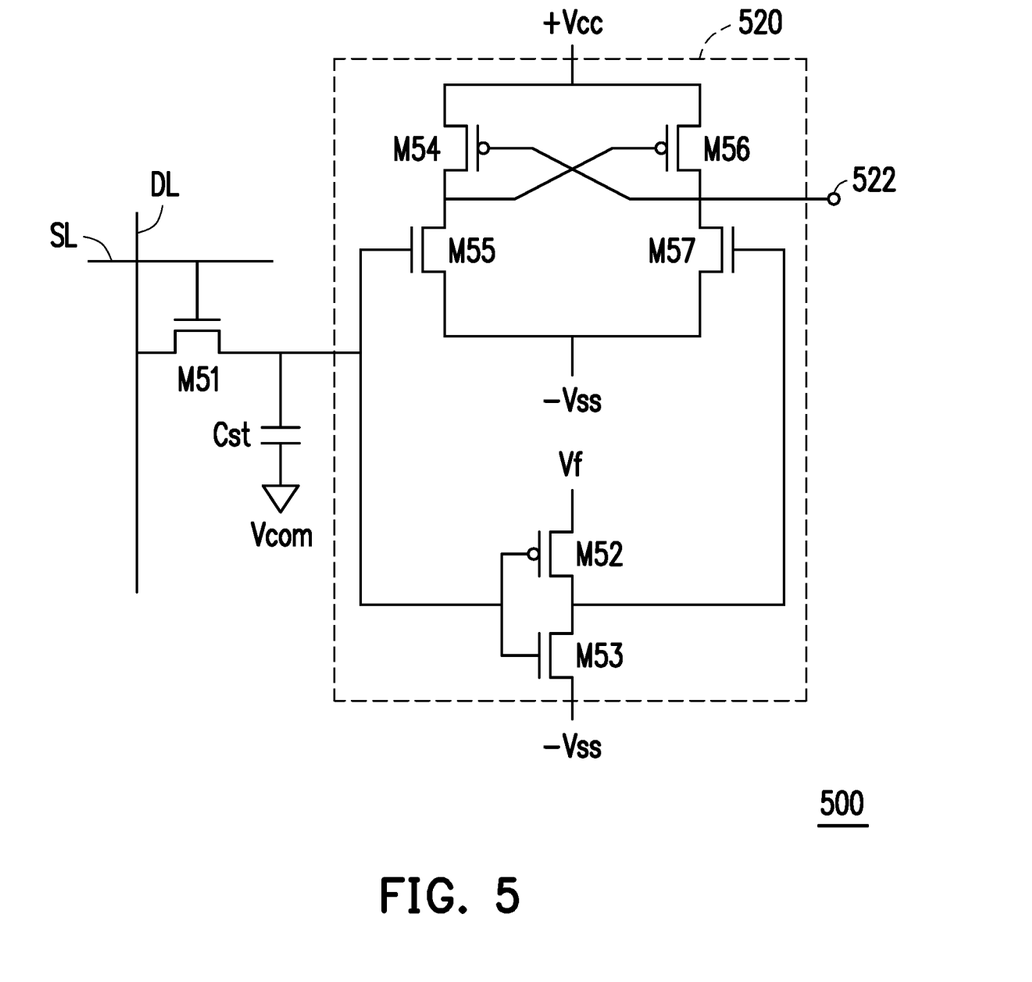
FIG. 5 is a circuit diagram illustrating a pixel circuit according to a fourth embodiment of the invention.

FIG. 5 is a circuit diagram illustrating a pixel circuit according to a fourth embodiment of the invention. Referring to FIG. 5, a pixel circuit 500 includes a transistor M51 (first transistor), a storage capacitor Cst, and an output stage 520. In the present embodiment, a control terminal of the transistor M51 is coupled to a scan line SL, and a first terminal of the transistor M51 is coupled to a data line DL. A first terminal of the storage capacitor Cst is coupled to a second terminal of the transistor M51 and the output stage 520, and a second terminal of the storage capacitor Cst receives a ground voltage Vcom. In the present embodiment, when the transistor M51 outputs a data signal provided by the data line DL to the storage capacitor Cst according to a scan signal provided by the scan line SL, the storage capacitor Cst stores a data voltage provided by the data signal.

In the present embodiment, the output stage 520 includes a transistor M52 (second transistor) and a transistor M53 (third transistor). A first terminal of the transistor M52 receives a voltage Vf, and a control terminal of the transistor M52 is coupled to the storage capacitor Cst. A first terminal of the transistor M53 is coupled to a second terminal of the transistor M52. A control terminal of the transistor M53 is coupled to the storage capacitor Cst. A second terminal of the transistor M53 receives a negative voltage −Vss. The second terminal of the transistor M52 and the first terminal of the transistor M53 are coupled to an output terminal 522, and the output terminal 522 is coupled to a pixel electrode of an electrophoretic display.

In the present embodiment, a first terminal of a transistor M54 (tenth transistor) receives a positive voltage +Vcc. A control terminal of the transistor M54 is coupled to the output terminal 522, and the output terminal 522 is coupled to the pixel electrode of the electrophoretic display. A first terminal of a transistor M55 (eleventh transistor) is coupled to a second terminal of the transistor M54. A control terminal of the transistor M55 is coupled to the storage capacitor Cst. A second terminal of the transistor M55 receives a negative voltage −Vss. A first terminal of a transistor M56 (twelfth transistor) receives the positive voltage +Vcc. A control terminal of the transistor M56 is coupled to the second terminal of the transistor M54. A second terminal of the transistor M56 is coupled to the output terminal 522. A first terminal of a transistor M57 (thirteenth transistor) is coupled to a second terminal of the transistor M56 and the output terminal 522. A second terminal of the transistor M57 receives the negative voltage −Vss. A control terminal of the transistor M57 is coupled to the second terminal of the transistor M52 and the first terminal of the transistor M53. In the present embodiment, the transistor M52, the transistor M54, and the transistor M56 are P-type transistors. The transistor M53, the transistor M55, and the transistor M57 are N-type transistors.

In the present embodiment, since an electrical leakage path is not present between the storage capacitor Cst and the output stage 520, the voltage of the storage capacitor Cst changes according to the data signal provided by the data line DL, and electrical leakage does not occur. In the present embodiment, the transistor M52 and the transistor M53 form an inverter circuit driven by a low voltage, and the transistor M54 to the transistor M57 form an inverter circuit driven by a high voltage. Specifically, the inverter circuit driven by a low voltage is configured to drive the inverter circuit driven by a high voltage. In the present embodiment, the voltage Vf is lower than +Vcc−Von and is higher than −Vss+Von (Von is the minimum voltage for turning on the transistor). More specifically, when the data voltage on the storage capacitor Cst is in the range from Vf to −Vss, the transistor M52 is on, and the transistor M53 is off. At this time, the control terminal of the transistor M57 receives the voltage Vf through the transistor M52 to turn off the transistor M57. The transistor M55 is on, and the transistor M55 outputs the negative voltage −Vss to the control terminal of the transistor M56 to turn on the transistor M56 and turn off the transistor M54. At this time, the transistor M56 outputs the positive voltage +Vcc to the output terminal 522. Therefore, when the data voltage on the storage capacitor Cst is in the range from Vf to −Vss, the output terminal 522 can steadily output the positive voltage +Vcc.

Conversely, when the data voltage on the storage capacitor Cst is −Vss, the transistor M52 is off, and the transistor M53 is on. At this time, the control terminal of the transistor M57 receives the voltage Vf through the transistor M53 to turn on the transistor M57. At this time, the transistor M57 outputs the negative voltage −Vss to the output terminal 522. The transistor M54 is on, and the transistor M55 is off. The transistor M54 outputs the positive voltage +Vcc to the control terminal of the transistor M56 to turn off the transistor M56. Therefore, when the data voltage on the storage capacitor Cst is −Vss, the output terminal 522 can steadily output the negative voltage −Vss.

In other words, the pixel circuit 500 of the present embodiment correspondingly outputs the positive voltage +Vcc or the negative voltage −Vss through the output stage 520 according to the data voltage provided by the storage capacitor Cst. In the present embodiment, as long as the voltage of the data signal provided by the data line DL is in the range from Vf to −Vss, it can enable the output stage 520 to provide the positive voltage +Vcc or the negative voltage −Vss. Therefore, the pixel circuit 500 of the present embodiment further exhibits the voltage level shifting function and can reduce power consumption of the data line DL. Moreover, as the scan signal and the data signal update the voltage of the storage capacitor Cst, even if electrical leakage or capacitance effect occurs in the pixel electrode of the electrophoretic display, the output stage 520 of the pixel circuit 500 will constantly supply the positive voltage +Vcc or the negative voltage −Vss to the output terminal 522, such that the voltage provided by the output terminal 522 to the pixel electrode of the electrophoretic display does not experience voltage attenuation.

In summary of the above, the pixel circuit of the invention can receive the data voltage of the storage capacitor through the specific output stage to effectively prevent electrical leakage in the data voltage of the storage capacitor and steadily provide the corresponding voltage signal to the pixel electrode of the electrophoretic display panel, such that the electrophoretic cells of the electrophoretic display can be properly driven, and the electrophoretic display can thus provide excellent display image quality.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A pixel circuit adapted to be arranged in an electrophoretic display, the pixel circuit comprising:
    a first transistor, wherein a first terminal of the first transistor is coupled to a data line, and a control terminal of the first transistor is coupled to a scan line;
    a storage capacitor coupled to a second terminal of the first transistor; and
    an output stage coupled to the second terminal of the first transistor and the storage capacitor and receiving a first voltage and a second voltage, wherein the output stage selectively outputs the first voltage or the second voltage to a pixel electrode of the electrophoretic display according to a data voltage provided by the storage capacitor, and the output stage comprises:
        a second transistor, wherein a first terminal of the second transistor receives the first voltage, and a control terminal of the second transistor is coupled to the storage capacitor; and
        a third transistor, wherein a first terminal of the third transistor is coupled to a second terminal of the second transistor, a control terminal of the third transistor is coupled to the storage capacitor, and a second terminal of the third transistor receives the second voltage,
        wherein the second terminal of the second transistor and the first terminal of the third transistor are coupled to the pixel electrode of the electrophoretic display.

2. The pixel circuit according to claim 1, wherein the second transistor is an N-type transistor, and the third transistor is a P-type transistor.

3. The pixel circuit according to claim 1, wherein the second transistor is a P-type transistor, and the third transistor is an N-type transistor.

4. The pixel circuit according to claim 1, wherein the output stage further comprises:
    a fourth transistor, wherein a first terminal of the fourth transistor receives the first voltage, a control terminal of the fourth transistor is coupled to the storage capacitor, and a second terminal of the fourth transistor is coupled to the control terminal of the second transistor; and
    a fifth transistor, wherein a first terminal of the fifth transistor is coupled to the second terminal of the fourth transistor and the control terminal of the second transistor, a control terminal of the fifth transistor is coupled to the storage capacitor, and a second terminal of the fifth transistor receives a ground voltage,
    wherein the fourth transistor and the fifth transistor further selectively output the first voltage or the ground voltage to the control terminal of the second transistor according to the data voltage provided by the storage capacitor.

5. The pixel circuit according to claim 4, wherein the output stage further comprises:
    a sixth transistor, wherein a first terminal of the sixth transistor receives a ground voltage, a control terminal of the sixth transistor is coupled to the storage capacitor, and a second terminal of the sixth transistor is coupled to the control terminal of the third transistor; and
    a seventh transistor, wherein a first terminal of the seventh transistor is coupled to the second terminal of the sixth transistor and the control terminal of the third transistor, a control terminal of the seventh transistor is coupled to the storage capacitor, and a second terminal of the seventh transistor receives the second voltage,
    wherein the sixth transistor and the seventh transistor further selectively output the ground voltage or the second voltage to the control terminal of the third transistor according to the data voltage provided by the storage capacitor.

6. The pixel circuit according to claim 5, wherein the output stage further comprises:
    an eighth transistor, wherein a first terminal of the eighth transistor is coupled to the second terminal of the fifth transistor and the first terminal of the sixth transistor, the first terminal of the eighth transistor receives a ground voltage, and a control terminal of the eighth transistor is coupled to the control terminal of the third transistor; and
    a ninth transistor, wherein a first terminal of the ninth transistor is coupled to a second terminal of the eighth transistor, a control terminal of the ninth transistor is coupled to the control terminal of the second transistor, and a second terminal of the ninth transistor is coupled to the pixel electrode of the electrophoretic display,
    wherein the eighth transistor and the ninth transistor further selectively output the ground voltage to the pixel electrode of the electrophoretic display according to the data voltage provided by the storage capacitor.

7. The pixel circuit according to claim 6, wherein the second transistor, the fourth transistor, the sixth transistor, and the eighth transistor are P-type transistors, and the third transistor, the fifth transistor, the seventh transistor, and the ninth transistor are N-type transistors.

8. The pixel circuit according to claim 1, wherein the output stage further comprises:
    a tenth transistor, wherein a first terminal of the tenth transistor receives a third voltage, and a control terminal of the tenth transistor is coupled to the pixel electrode of the electrophoretic display;
    an eleventh transistor, wherein a first terminal of the eleventh transistor is coupled to a second terminal of the tenth transistor, a control terminal of the eleventh transistor is coupled to the storage capacitor, and a second terminal of the eleventh transistor receives the second voltage;
    a twelfth transistor, wherein a first terminal of the twelfth transistor receives the third voltage, a control terminal of the twelfth transistor is coupled to the second terminal of the tenth transistor, and a second terminal of the twelfth transistor is coupled to the pixel electrode of the electrophoretic display; and a thirteenth transistor, wherein a first terminal of the thirteenth transistor is coupled to the second terminal of the twelfth transistor and the pixel electrode of the electrophoretic display, a second terminal of the thirteenth transistor receives the second voltage, and a control terminal of the thirteenth transistor is coupled to the second terminal of the second transistor and the first terminal of the third transistor.

9. The pixel circuit according to claim 8, wherein the second transistor, the tenth transistor, and the twelfth transistor are P-type transistors, and the third transistor, the eleventh transistor, and the thirteenth transistor are N-type transistors.

\* \* \* \* \*